US012675792B2

(12) United States Patent
Alsahnawi et al.

(10) Patent No.: US 12,675,792 B2
(45) Date of Patent: Jul. 7, 2026

(54) NODE MONITORING TO DETECT MISCLASSIFIED ON-CHAIN ADDRESSES

(71) Applicant: Capital One Services, LLC, McLean, VA (US)

(72) Inventors: Hazar Alsahnawi, McLean, VA (US); Mary Sweeney, Wilmington, DE (US); Joshua Edwards, Philadelphia, PA (US); Kevin Osborn, Newton Highlands, MA (US); Benjamin Eng, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 323 days.

(21) Appl. No.: 18/180,288

(22) Filed: Mar. 8, 2023

(65) Prior Publication Data

US 2024/0303661 A1    Sep. 12, 2024

(51) Int. Cl.
| | |
|---|---|
| *G06Q 20/40* | (2012.01) |
| *G06N 20/00* | (2019.01) |
| *G06Q 20/38* | (2012.01) |
| *H04L 9/40* | (2022.01) |

(52) U.S. Cl.
CPC ......... *G06Q 20/4016* (2013.01); *G06N 20/00* (2019.01); *G06Q 20/389* (2013.01); *H04L 63/0236* (2013.01); *H04L 63/0272* (2013.01)

(58) Field of Classification Search
CPC ................................................ G06Q 20/4016
See application file for complete search history.

(56) References Cited

U.S. PATENT DOCUMENTS

| | | | | |
|---|---|---|---|---|
| 10,484,413 B2 * | 11/2019 | Kar | ...................... | H04L 9/3239 |
| 10,873,456 B1 * | 12/2020 | Dods | ...................... | H04L 9/3239 |
| 11,005,868 B2 * | 5/2021 | Mathews | ................. | G06N 3/02 |
| 11,582,187 B1 * | 2/2023 | Maknickas | ......... | H04L 63/1408 |
| 11,601,337 B1 * | 3/2023 | Suto | .................... | H04L 43/0852 |
| 12,058,137 B1 * | 8/2024 | Hanwella | ........... | H04L 63/0263 |
| 2020/0334680 A1 * | 10/2020 | Vanga | ..................... | G06N 20/00 |
| 2022/0103378 A1 * | 3/2022 | Unger | .................. | H04L 9/3239 |
| 2023/0367887 A1 * | 11/2023 | Dande | ................. | G06F 21/6254 |
| 2024/0235861 A1 * | 7/2024 | Lavid Ben Lolo | ....... | H04L 9/50 |

* cited by examiner

*Primary Examiner* — John W Hayes
*Assistant Examiner* — Zehra Raza
(74) *Attorney, Agent, or Firm* — Foley & Lardner LLP

(57) ABSTRACT

A method and related system of operations include obtaining, from a set of internet protocol (IP) addresses, a set of transaction messages indicating an on-chain address and determining whether a stored set of registered IP addresses comprises each respective address of the set of IP addresses. The method further includes determining whether a predicted use pattern related to the set of transaction messages matches a use pattern category and updating a record of an off-chain database associated with the on-chain address based on a determination that the stored set of registered IP addresses does not comprise each respective address of the set of IP addresses and a determination that the predicted use pattern matches the use pattern category.

19 Claims, 5 Drawing Sheets

300

304 Scan On-Chain Transactions Based On On-Chain Address To Obtain Set of On-Chain Transactions Of On-Chain Address 308 Generate Sequence Of Vectors Based On On-Chain Transactions 312 Predict Use Pattern Based On Sequence Of Vectors 320 Predicted Use Pattern Satisfies Alert Criteria?

No

Yes

324 Update Off-Chain Record Of On-Chain Address

332 Update State Of On-Chain Application

400

Obtain Training Set Based on Known Set of On-Chain Addresses
Indicating Single-User or Multi-User Addresses                    404

Train Machine learning Model Based on Training Set               408

Train Machine Learning Model Based On Transaction Information
Associated With Newly Detected On-Chain Address                  416

NODE MONITORING TO DETECT MISCLASSIFIED ON-CHAIN ADDRESSES

SUMMARY

Blockchains are generally public databases distributed across multiple computing devices that can provide a record of traceable, immutable records of various types of digital resources. These resources may be used to verify an identity, indicate a permission, or operate as collateral. However, the anonymous, low-information nature of a blockchain does not provide sufficient assurances that a user has accurately classified themselves based on on-chain information. For example, a user may represent himself as the sole owner of a crypto wallet and may even provide a private key to the wallet to prove ownership. Such a user may actually be one of many users having access to the crypto wallet, where such misrepresentations may pose an unsustainable amount of risk to long-term use of blockchain assets.

Some embodiments may detect such misclassifications and provide entities with a means of responding to such intentional misclassification. For example, some embodiments may update records indexed by or otherwise identifying on-chain addresses to flag an on-chain address of a blockchain as misclassified and take remedial actions in response to this misclassification. Some embodiments may retrieve a set of on-chain transactions of an on-chain address from a scan of on-chain transactions based on a request identifying the on-chain address. Some embodiments may then generate a sequence of embedding vectors by providing the set of on-chain transactions to an encoder neural network, wherein each respective embedding vector corresponds with a respective transaction of the set of on-chain transactions. Some embodiments may then predict a use pattern of the on-chain address by providing the sequence of embedding vectors to a machine learning model, wherein the use pattern indicates multiple users. Some embodiments may then determine whether the predicted use pattern matches with an expected use pattern that is provided by a user, wherein the expected use pattern indicates a single user. Some embodiments may then update a record of the on-chain address in an off-chain database to indicate anomalous activity in response to a determination that the predicted use pattern does not match with the expected use pattern.

Some embodiments may perform other operations to detect account misclassifications. For example, some embodiments may obtaining, from a source internet protocol (IP) address, a transaction message indicating a source on-chain address of a blockchain and a destination on-chain address of the blockchain. The transaction message may update to a state of a blockchain to record this transfer. Some embodiments may then determine whether the source IP address can be found in a stored set of registered IP addresses. If the source IP address is not found in the stored set of registered IP addresses, some embodiments may activate a predicted use pattern by providing an amount indicated by the transaction message to a machine learning model. Some embodiments may then determine whether the predicted use pattern matches a use pattern category indicating that multiple users control the source on-chain address and, if so, update a record of an off-chain database to indicate a use pattern violation for the source on-chain address.

Various other aspects, features, and advantages will be apparent through the detailed description of this disclosure and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

BRIEF DESCRIPTION OF THE DRAWINGS

Detailed descriptions of implementations of the present technology will be described and explained through the use of the accompanying drawings.

Figure 1:
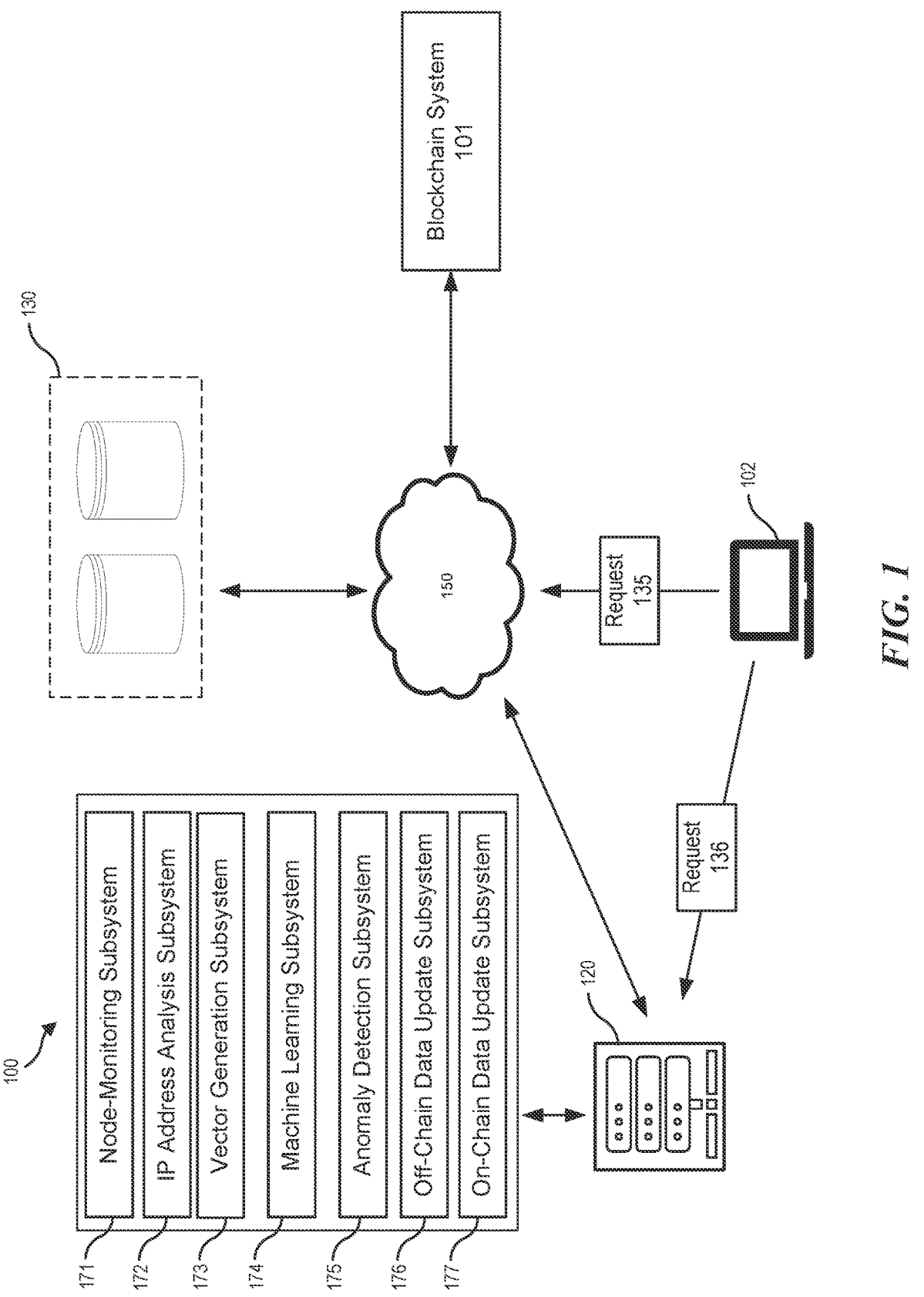
FIG. 1 is a block diagram illustrating a portion of an example system that detects misclassified accounts, in accordance with some embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

FIG. 1 is a block diagram illustrating a portion of an example system that detects misclassified accounts, in accordance with some embodiments. The example system 100 includes a client computing device 102 used by a first user. While shown as a laptop computer, it should be noted that the client computing device 102 may include other types of computing devices such as a desktop computer, a wearable headset, a smartwatch, another type of mobile computing device, etc. In some embodiments, the client computing device 102 may communicate with various other computing devices via a network 150, where the network 150 may include the Internet, a local area network, a peer-to-peer network, etc.

The client computing device 102 may send and receive messages through the network 150 to communicate with a server 120 or other computing systems. For example, the client computing device 102 may send a first request 135 to a network 150 causing a transaction that updates a state of a blockchain managed by a blockchain system 101. Alternatively, or additionally, the client computing device 102 may send a second request 136 to a node hosted by the server 120, where the node may be a part of the blockchain system 101. As used in this disclosure, unless otherwise indicated, the terms "on-chain resource" and "resource" may be used interchangeably. The server 120 may include a set of non-transitory, computer-readable media (e.g., "storage media") storing program instructions to perform one or more operations of subsystems 171-177. Furthermore, as described elsewhere, enforcing a requirement that the client computing device 102 send the second request 136 to the node hosted by the server 120 may provide additional information with respect to the source IP address of the second request 136. While one or more operations are described herein as being performed by particular components of the system 100, those operations may be performed by other components of the system 100, a cloud computing service, or another distributed computer service. For example, one or more operations described in this disclosure as being performed by the server 120 may instead be performed by a cloud computing service. Furthermore, some embodiments may communicate with an application program interface (API) of a third-party data service via the network 150 to perform a learning model training operation, obtain machine learning model parameters, or use other services that perform one or more operations described in this disclosure.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure, such as data associated with digital assets, resource identifiers, user identifiers, historical records associated with users, machine learning model parameters, machine learning model outputs, etc. For example, data objects of the set of databases 130 may include names, email addresses, other off-chain identifiers, keys, values derived from keys (e.g., an on-chain address derived from a key), etc. Furthermore, the system 100 may communicate with or otherwise effect changes on blockchain system 101, as described elsewhere in this disclosure.

In some embodiments, a node-monitoring subsystem 171 may monitor a node of a blockchain system to detect and respond to the second request 136 or other requests sent by the client computing device 102. As disclosed elsewhere in this disclosure, some embodiments may require that all transfers from an on-chain account be initialized at a monitored node, where the node-monitoring subsystem 171 may monitor this monitored node to help detect misclassifications or anomalous activity. The node-monitoring subsystem 171 may collect the source internet protocol (IP) address of the second request 136 or collect device-specific information associated with the client computing device 102. Furthermore, some embodiments may establish a new node for a blockchain network. For example, the node-monitoring subsystem 171 may establish a new node that participates as a full node in the blockchain system 101 and monitor all transactions through the new node. Such monitoring may provide information such as source IP addresses, user-identifying information, source on-chain address of a transaction, a destination on-chain address of the transaction, an amount of the transaction, a digital asset type of the transaction, etc. As used in this disclosure, a source on-chain address of a transaction may be the address from which a digital asset is being transferred, and a destination on-chain address of the transaction may be the address to which the digital asset is being transferred.

In some embodiments, the node-monitoring subsystem 171 may detect changes to a blockchain of the blockchain system 101 indicating transfers from an on-chain address. For example, the node-monitoring subsystem 171 may detect updates to a blockchain managed by the blockchain system 101 that indicate that some amount of a digital asset has been reallocated from a first on-chain address to a second on-chain address, where the first on-chain address is a registered on-chain address of the server 120. In some embodiments, the detection of an update to a registered on-chain address that was caused by a request that was not first sent to the node hosted by the server 120 may cause one or more remedial actions to take place. Furthermore, some embodiments may use an on-chain application (i.e., smart contract) to enforce the use of the node hosted by the server 120 or another node of a set of monitored nodes when updating a registered on-chain address.

In some embodiments, the IP address analysis subsystem 172 may perform operations to detect anomalous activities based on a set of IP addresses or information derived from the set of IP addresses. For example, some embodiments may determine that the source IP address of the second request 136 is not in a set of registered source IP addresses. Such a request may be an indication that the request is not being made by a designated account owner of an on-chain address. In response to this determination, some embodiments may predict a use pattern using machine learning operations, as described elsewhere in this disclosure.

Alternatively, or in addition, some embodiments may obtain transaction data from updates to an on-chain dataset that indicates outflow transfers from a registered on-chain address. Some embodiments may determine whether any such updates or other elements of the on-chain dataset indicating the second on-chain address matches any transaction message of the set of transaction messages corresponding with requests from a set of registered IP address associated with the on-chain address. Some embodiments may determine that the on-chain update indicates the existence of at least one transaction message that was not caused by a request received from the set of registered IP addresses. Such a determination may indicate that a user has circumvented a restriction that requires that all outgoing transactions be initially sent through a set of monitored nodes. In response to a determination that the update indicates the existence of at least one transaction that was not caused by a request received by the set of registered IP addresses, some embodiments may predict a use pattern using machine learning operations, as described elsewhere in this disclosure.

Furthermore, while some embodiments may predict a use pattern using machine learning operations in response to an IP address analysis result, some embodiments may directly update a record associated with an on-chain address. For example, some embodiments may directly update a record indexed by an on-chain address to indicate a use pattern violation associated with the on-chain address in response to either (i) a determination that an update indicates the existence of at least one transaction that was not caused by a request received by the set of registered IP addresses or (ii) a determination that a source IP address of a request is not in a set of registered source IP addresses.

Alternatively, some embodiments may forego using the IP address analysis as a trigger for machine learning operations. For example, as described elsewhere in this disclosure, some embodiments may perform a set of a machine learning model operations to predict a use pattern without being triggered to do so by an IP address analysis. Furthermore, some embodiments may use the result of an IP address analysis as an additional input to a machine learning model.

In some embodiments, the vector generation subsystem 173 may retrieve on-chain transactions from on-chain transaction data retrieved from the blockchain system 101 and generate a set of transaction vectors. For example, the vector generation subsystem 173 may use encoder layers of an encoder-decoder neural network model ("encoder neural network") to generate a sequence of embedding vectors representing transactions. Inputs into the encoder neural network may include the transaction amounts, the type of digital asset being transferred (e.g., an identifier of Bitcoin, Ethereum, an NFT, etc.), a transaction source address, a transaction destination, etc. Alternatively, or additionally, some embodiments may include information associated with the transaction request, such as an IP address, a geographic location (e.g., a geographic location derived from an IP address), an indicator that the IP address corresponds with a virtual private network (VPN), etc.

In some embodiments, the machine learning subsystem 174 may predict a use pattern based on information associated with the transaction data retrieved from the blockchain system 101. For example, the machine learning subsystem 174 may predict a use pattern based on embedding vectors derived from blockchain system 101 with the use of the vector generation subsystem 173. Alternatively, or additionally, the machine learning subsystem 174 may predict a use pattern based on other information associated with the transaction data retrieved from the blockchain system 101. For example, the machine learning subsystem 174 may use, as inputs, categories associated with a recipient on-chain address or a source on-chain address, a frequency of transactions (e.g., determining a count of transactions within a pre-determined duration), etc.

In some embodiments, the off-chain data update subsystem 176 may perform operations based on the predicted use patterns. For example, the off-chain data update subsystem 176 may determine whether a predicted use pattern matches with an expected use pattern provided by a user. If the predicted use pattern matches with the expected use pattern, then some embodiments may take no further action. If the predicted use pattern does not match with the expected use pattern, some embodiments may update a record or perform other operations. For example, a user may provide "single-user account" as the use pattern category for an on-chain address. Based on a determination that the machine learning subsystem 174 has predicted "multi-user account" as a use pattern category, and that this predicted use pattern does not match the provided use pattern "single-user account," the off-chain data update subsystem 176 may submit a query to the databases 130 to update a record indexed or otherwise associated with the on-chain address. The updated record may indicate a detected misclassification and cause the off-chain data update subsystem 176 to perform additional operations, such as preventing updates to another portion of the record or preventing updates to another associated record. For example, some embodiments may determine that an on-chain address use pattern provided by a user does not match an on-chain address use pattern predicted from transactions associated with the on-chain address and, in response, prevent a second record of the user (e.g., a record of the user's financial account) from being updated.

In some embodiments, the on-chain update subsystem 177 may perform operations to update an on-chain state. For example. Some embodiments may use an on-chain application to update the on-chain state to reverse a transfer, stop further transfers, etc. Some embodiments may perform other operations to restrict or enable one or more changes to a blockchain state. For example, some embodiments may determine that a transaction would reduce the total amount assigned to an on-chain address of a smart contract wallet below a minimum balance threshold indicated by the smart contract wallet. In response, the on-chain application may prevent the transaction from proceeding. For example, some embodiments may obtain data indicating that an on-chain address has been allocated with a preexisting amount and determine a possible remaining amount based on a transaction amount. In response to a determination that a minimum threshold for the on-chain address would still be satisfied, some embodiments may permit the transaction to occur without taking further action. However, in response to a determination that the minimum threshold for the on-chain address is not satisfied (e.g., the remaining amount is less than the minimum threshold), some embodiments may lock a user's account, send a warning message, update an on-chain application state, or perform some other operation described in this disclosure.

Figure 2:
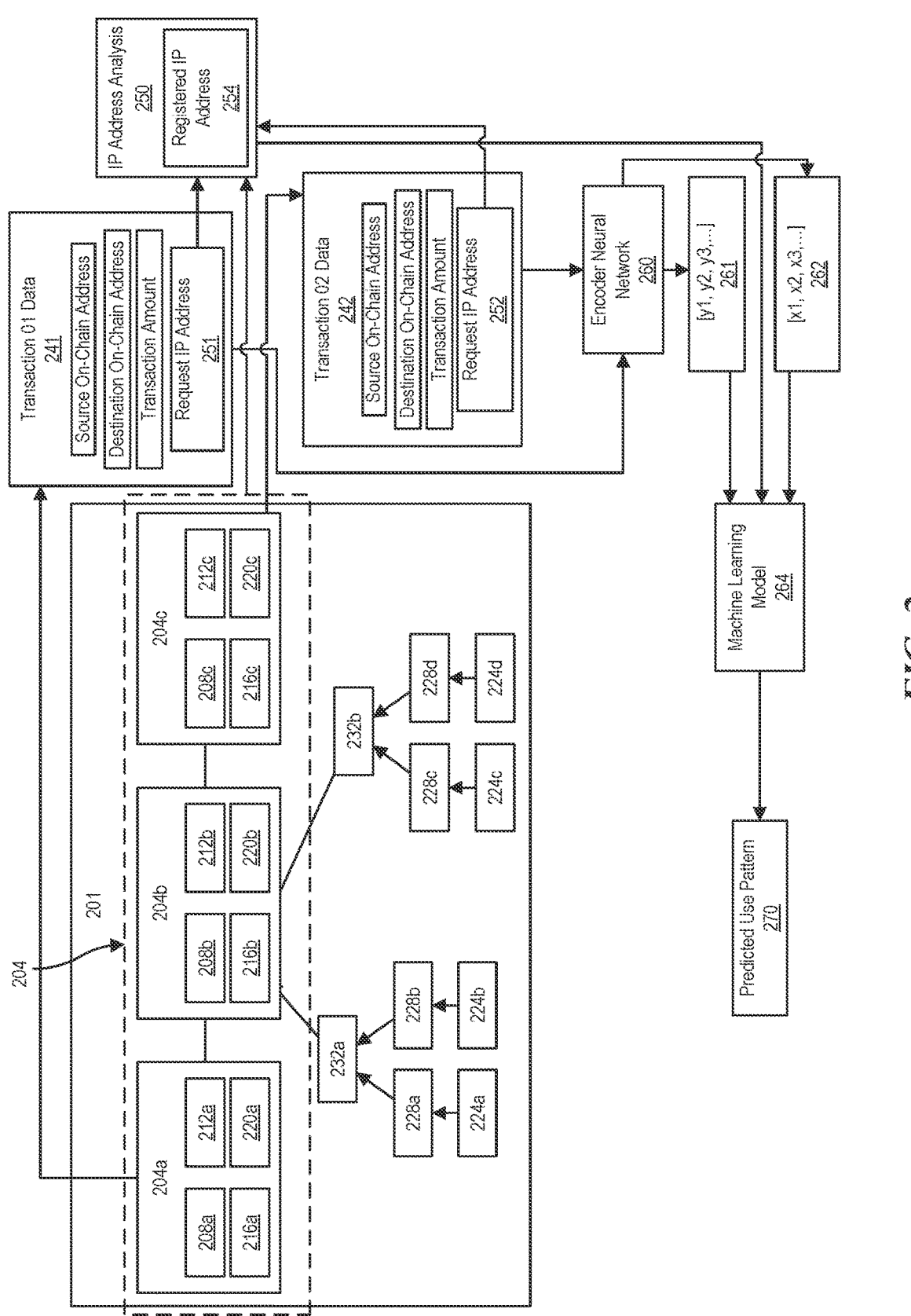
FIG. 2 is an example blockchain system that is analyzed to detect misclassified blockchain accounts, in accordance with some embodiments.

FIG. 2 is an example blockchain system that is analyzed to detect misclassified blockchain accounts, in accordance with some embodiments. In some embodiments, a blockchain system 201 includes a blockchain 204. The blockchain 204 is a distributed database that is shared among multiple nodes (e.g., computers) of a blockchain network, where the multiple nodes may include the server 220 or may be independent of the server 220. The terms "blockchain" and "chain" are used interchangeably herein. As a database, the blockchain 204 stores information electronically in a digital format. In some embodiments, blockchain 204 collects information together in groups, known as "blocks," where such blocks may include an earlier block 204a, a middle block 204b, and a later block 204c. The blockchain 204 may store records of transactions for on-chain resources such as Bitcoin, Ethereum, NFTs, etc. The blockchain 204 may act as a distributed ledger of transactions that is maintained by a blockchain system 201. In some embodiments, the blockchain system 201 implements storage of an identical blockchain at each node, even when nodes receive transactions in different orderings.

The blockchain 204 structures its data into blocks that are strung together. Blocks such as the earlier block 204a, the middle block 204b, or the later block 204c may have limited storage capacities that, when filled, are closed and linked to a previously filled block. For example, once the middle block 204b is filled, it may be linked to the earlier block 204a, where such an arrangement of blocks may form a part of the blockchain 204. Similarly, additional information stored in the later block 204c may eventually be linked to the middle block 204b using a similar operation once the later block 204c is filled.

Each block of the blockchain 204 can represent an update which indicates one or multiple transactions and can include a cryptographic hash of the previous block. For example, a hash 208*c* may link to the middle block 204*b*, a hash 208*b* may link to the earlier block 204*a*, and a hash 208*a* of the earlier block 204*a* may link to an even earlier block that is not shown. Each respective block of the blockchain 204 may include a respective timestamp of the set of timestamps 212*a-c*, where the respective timestamp indicates a time associated with the respective block. Each respective block of the blocks 204*a-c* may also include a respective transactions root hash of the set of transactions root hashes 216*a-c*, where a transactions root hash may indicate the proof that its respective block contains all the transactions in the proper order. Each respective block of the blocks 204*a-c* may include a respective nonce of the set of nonces 220*a-c*, where each respective nonce may include any generated random or semi-random number usable during proof of work (PoW) mining or other blockchain operations.

Some embodiments may convert each transaction recorded by the blocks of the blockchain 204 into a set of embedding vectors. For example, some embodiments may convert transactions corresponding to the set of blocks 204*a-c* into a set of embedding vectors by providing the transactions as inputs into an encoder neural network. Once converted into a transaction embedding space, some embodiments may then perform cluster analysis or provide the embedding vectors as inputs into a classifier machine learning model to predict a use pattern for an on-chain address.

Some embodiments may detect updates that correspond with a transaction involving a registered on-chain address. For example, some embodiments may detect a transaction 224*d* and determine that the transaction 224*d* indicates a transfer of digital assets from a registered on-chain address to another on-chain address. The transaction 224*d* may represent a transfer or reallocation operation of an on-chain resource, such as an amount of a digital token, an NFT, etc. The transaction 224*d* may be one of transactions 224*a-d*, where each leaf node of leaf nodes 228*a-d* contains a hash corresponding to the transactions 224*a-d* respectively. Hashes of the leaf nodes 228*a-d* may be used as inputs to generate hashes of non-leaf nodes 232*a* and 232*b*, respectively. Each hash of the non-leaf nodes 232*a-b* may then be used to generate the transactions root hash 216*b* that is contained in the middle block 204*b*. The transaction 224*d* may represent a transfer of a digital asset from a user's on-chain address, where the transfer may either conform or violate a set of use requirements associated with the on-chain address.

Some embodiments may obtain transaction data for a first transaction 241 and a second transaction 242 from the earlier block 204*a* and the later block 204*c*. The transaction data for the first transaction 241 may include a source on-chain address of the first transaction 241, a destination on-chain address of the first transaction 241, an amount of digital assets been transferred during the first transaction 241, and a first request IP address 251. The transaction data for the second transaction 242 may include a source on-chain address of the second transaction 242, a destination on-chain address of the second transaction 242, an amount of digital assets been transferred during the second transaction 242, and a second request IP address 252.

Some embodiments may provide, as inputs, the first request IP address 251 and the second request IP address 252 to an IP address analysis subsystem 250, which may compare the first request IP address 251 and the second request IP address 252 with a set of registered IP addresses 254. Some embodiments may determine that one or more of the IP addresses associated with the transaction is not a registered IP address of the set of registered IP addresses. For example, some embodiments may use the IP address analysis subsystem 250 determine that the first request IP address 251 is not found in the set of registered IP addresses 254. In response, some embodiments may trigger the use of a machine learning model 264 to determine a predicted use pattern 270. Furthermore, some embodiments may provide, to the machine learning model 264, results of the IP address analysis subsystem 250, where such results may include a label assigned to an IP address, a count of matches, geographic locations, or other information derived from IP addresses.

Some embodiments may provide the first transaction 241 to an encoder neural network 260 to obtain a first vector 261. Similarly, some embodiments may provide the second transaction 242 to the encoder neural network 260 to obtain a second vector 262. Some embodiments may provide that the first vector 261 and second vector 262 may be provided to the machine learning model 264 to obtain the predicted use pattern 270, where other information, such as information derived from the first request IP address 251 and the second request IP address 252 may be provided to the machine learning model 264 to obtain the predicted use pattern 270.

Some embodiments may update an on-chain application based on the predicted use pattern 270. For example, the blockchain 204 may use a set of on-chain applications (i.e., smart contracts) to enable more complex transactions and may even include transactions with on-chain addresses of smart contracts. An on-chain application includes computer code that can be executed on a secure platform, such as an Ethereum platform, where the code may record transactions (e.g., 224*a-d*) in blockchains. The computer code may exist across a distributed, decentralized blockchain network and may execute concurrently across different nodes. The on-chain application may even include a wallet, which may be referred to as a smart contract wallet. The smart contract may be used to enforce one or more rules, such as a rule that a request IP address be an address of the set of registered IP addresses 254. In response to a detection of a rule violation, the smart contract may restrict access to an on-chain address controlled by the smart contract, prevent transfers from the on-chain address, or perform another activity associated with the on-chain address.

Figure 3:
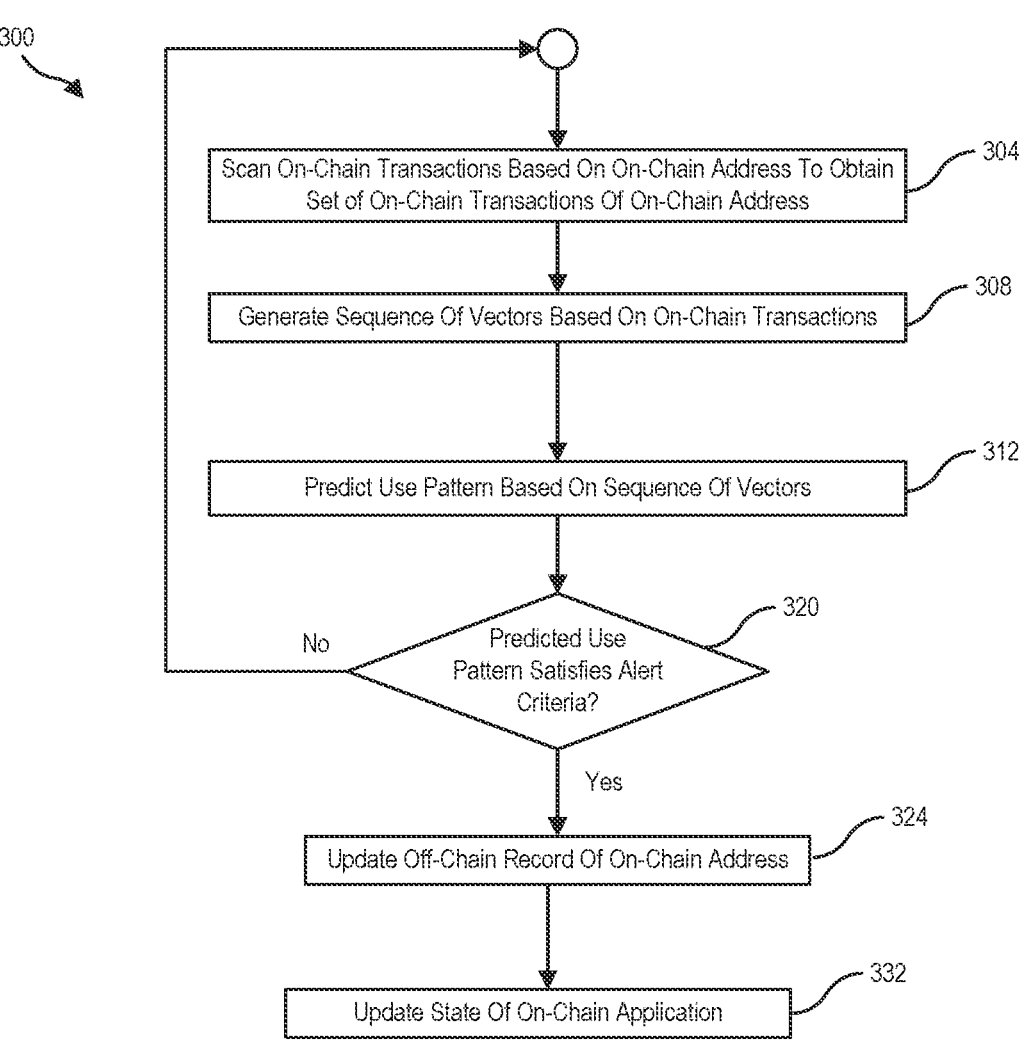
FIG. 3 shows a flowchart of a process for using a machine learning model to detect an anomalous account based on transaction vectors, in accordance with one or more embodiments.

FIG. 3 shows a flowchart of a process for using a machine learning model to detect an anomalous account based on transaction vectors, in accordance with one or more embodiments. Some embodiments may scan on-chain transactions based on an on-chain address to obtain a set of on-chain transactions of the on-chain address, as indicated by block 304. Some embodiments may directly scan a blockchain stored on a blockchain network to obtain a history of transactions and search through the obtained transaction data to obtain a corresponding set of transactions indicating a target on-chain address. Alternatively, or additionally, some embodiments may obtain the transaction data through a search service, data retrieval service, or other third-party service. For example, some embodiments may send a query to a search service application program interface (API) and, in response, receive a transaction dataset indicating transactions involving a target on-chain address.

Some embodiments may generate a sequence of vectors based on the on-chain transactions, as indicated by block 308. Some embodiments may generate a set of vectors using an encoder neural network or another type of machine learning model by providing the encoder neural network with the set of on-chain transactions as inputs. The output of the encoder neural network may be kept in the same sequence as the input such that the sequence of embedding vectors may be used to predict a use pattern, as described elsewhere in this disclosure. In some embodiments, each respective embedding vector of the sequence of vectors may correspond with a respective transaction of the set of on-chain transactions.

Some embodiments may restrict the number of on-chain transactions that are analyzed to a recent set of on-chain transactions. For example, some embodiments may determine a subset of on-chain transactions that have occurred within a pre-determined duration and select this subset of on-chain transactions for further analysis when predicting a use pattern. The pre-determined duration may be a system default value, provided by a user, provided by a parameter of a configuration file, etc., where the pre-determined duration may be a duration that is less than or equal to one hour, one day, one week, four weeks, six weeks, three months, twelve months, five years, ten years, or some other duration. For example, some embodiments may retrieve the pre-determined duration value from a configuration file that sets the pre-determined duration to be six weeks and then scan a blockchain to obtain a subset of transactions involving a target on-chain address. Some embodiments may then provide the obtained subset of transactions to an encoder neural network to obtain a sequence of vectors based on the subset of transactions.

Some embodiments may use the structure of a hierarchical deterministic key to retrieve transactions associated with different blockchain addresses. A hierarchical deterministic key may be used to generate multiple other derived keys that correspond with different on-chain addresses. Some embodiments may request and be provided with a hierarchical deterministic key from a user. Some embodiments may determine a plurality of derived keys based on the hierarchical deterministic key and determine a corresponding plurality of on-chain addresses based on the plurality of derived keys. For example, some embodiments may use a hashing algorithm to determine a derived key from a hierarchical deterministic key and then use the derived key to determine an on-chain address using another hashing algorithm. Some embodiments may then retrieve a superset of on-chain transactions from a blockchain network, where each respective set of on-chain transactions involves at least one on-chain address of the plurality of on-chain addresses. Some embodiments may then determine a respective vector for each respective transaction of the superset of on-chain transactions to generate an embedding vector sequence for each respective on-chain address of the plurality of on-chain addresses. Some embodiments may analyze each respective sequence of the resulting plurality of vector sequences corresponding to each respective on-chain address separately to determine a respective predicted use pattern for the respective on-chain address. Alternatively, or additionally, some embodiments may combine the vectors of the superset into a superset of vector sequences, where the superset of vector sequences includes each respective sequence of embedding vectors for each respective on-chain address of the plurality of on-chain addresses derived from a hierarchical deterministic key. As described elsewhere in this disclosure, some embodiments may then determine a predicted use pattern based on the superset sequence of vectors for the combined set of on-chain addresses that are all derived from a hierarchical deterministic key.

Some embodiments may provide, to a vector generation model, a transaction frequency or values correlated with the transaction frequency to determine a vector. Some embodiments may determine a set of time differences between transaction events of a set of on-chain transactions and determine a set of vectors for the transactions based on the set of time differences. For example, if a first transaction has a request timestamp equal to "0 milliseconds" and a second transaction has a request timestamp equal to "1000 milliseconds," the transaction data of the second transaction may include the time difference of "1000." Some embodiments may then provide this time difference of "1000" as an input to an encoder neural network or another vector generation model to determine a corresponding transaction embedding vector. Alternatively, or in addition, some embodiments may determine a frequency value directly and provide the frequency value as an input to the encoder neural network or another vector generation model. For example, some embodiments may determine a frequency of transaction for each transaction, where the frequency may be determined as a moving average within a predefined time range (e.g., transaction frequency within a minute, an hour, a day, or some other frequency duration) or within a predefined number of transactions (e.g., a transaction frequency determined from a previous N transactions or a transaction frequency determined from a previous N transactions and next N transactions, where N may be 1, 2, 3, or some other integer greater than one). Some embodiments may then provide the frequency of a transaction as an additional input to an encoder neural network when determining an embedding vector for the transaction. By generating a sequence of vectors based on a set of transaction frequencies or a set of time differences between the transactions, some embodiments may detect certain forms of anomalous behavior, such as layering or laundering.

Some embodiments may provide, to a vector generation model, a transaction amount to determine a vector. For example, if a transaction of a transaction set indicates a transfer of 1,500 tokens from a first address to a second address, the transaction data of the transaction may include the amount "1,500." Some embodiments may then provide this transaction amount, "1,500" as an input to an encoder neural network or another vector generation model to determine a corresponding transaction embedding vector of a sequence of vectors generated from the transaction set. Furthermore, instead of simply considering total amounts transferred, some embodiments may provide differences between amounts as inputs to a encoder neural network or another vector generation model. For example, if a first transaction of a transaction set indicates a transfer of 1,500 tokens from a first address to a second address and a consecutive second transaction of the transaction set indicates a transfer of 500 tokens from a first address to a second address, some embodiments may include the difference "−1000" in the second transaction data that is provided to an encoder neural network to determine a vector. By generating a sequence of vectors based on a set of transaction amount or a set of differences between the transaction amounts, some embodiments may detect certain forms of multi-user account behavior.

Some embodiments may analyze other on-chain addresses involved in an obtained set of transactions. For example, some embodiments may detect a number of inflow or outflow transactions between a target on-chain address and a second on-chain address. Some embodiments may access a database to retrieve a record or other information associated with the second on-chain address, where the record or other information links an address type category with the second on-chain address. Some embodiments may then provide the address type category as an input to an encoder neural network to determine a sequence of vectors.

As described elsewhere in this disclosure, some embodiments may provide the sequence of vectors as an input to another machine learning model to determine a predicted use pattern.

Some embodiments may provide, to a vector generation model, a transaction amount to determine a vector. For example, if a transaction of a transaction set indicates a transfer of 1,500 tokens from a first address to a second address, the transaction data of the transaction may include the amount "1,500." Some embodiments may then provide this transaction amount, "1,500" as an input to an encoder neural network or another vector generation model to determine a corresponding transaction embedding vector of a sequence of vectors generated from the transaction set. Furthermore, instead of simply considering total amounts transferred, some embodiments may provide differences between amounts as inputs to an encoder neural network or another vector generation model. For example, if a first transaction of a transaction set indicates a transfer of 1,500 tokens from a first address to a second address and a consecutive second transaction of the transaction set indicates a transfer of 500 tokens from a first address to a second address, some embodiments may include the difference "−1000" in the second transaction data that is provided to an encoder neural network to determine a vector. By generating a sequence of vectors based on a set of transaction amount or a set of differences between the transaction amounts, some embodiments may detect certain forms of multi-user account behavior.

While some embodiments may generate vectors for single transactions, some embodiments may generate vectors based on multiple transactions. For example, some embodiments may provide transaction data for 123 transactions involving transaction outflows from an on-chain address to an encoder neural network. The encoder neural network may then output a single embedding vector associated with the on-chain address that represents the 123 transactions.

Furthermore, some embodiments may include information associated with a transaction as input for an encoder neural network or other vector generation model. For example, some embodiments may obtain an IP address that is mapped to a transaction message because it is the source IP address of the transaction message and provide the IP address to an encoder neural network in conjunction with other transaction data in order to obtain a vector. Additionally, as described elsewhere, some embodiments may use IP address information in other ways, such as determining whether the IP address matches with a VPN IP address and, in response, sending a warning message to an associated message destination of the user indicating that the IP address has been detected as a VPN IP address. As described elsewhere, some embodiments may enforce special restrictions on VPN IP address usage.

Some embodiments may predict a use pattern based on the sequence of vectors, as indicated by block 312. Some embodiments may provide the sequence of vectors described in block 308 to a machine learning model and use the output of the machine learning model as a predictor of a use pattern. In some embodiments, the predicted use pattern may indicate that an on-chain address is controlled by a single user. Alternatively, the predicted use pattern may indicate that the on-chain address is controlled by multiple users. Furthermore, the predicted use pattern may indicate other types of uses, such as use as a pooling account, use as a layering account, or use as collateral for an on-chain application. In addition, some embodiments may predict a count of users capable of transferring resources from an on-chain address or a range for the count of users. For example, some embodiments may provide a machine learning model with transaction data, IP addresses, information derived from IP addresses (e.g., geographic locations), etc. to predict that an on-chain address is controlled by M separate users where M may be equal to one, two, three, or some other integer greater than zero. Alternatively, or additionally, some embodiments may predict that the number of users capable of controlling transfers from an on-chain address is inclusively between the count range of M and N, where M and N are integers, and M is less than N. As described elsewhere, some embodiments may update a record associated with an on-chain address based on a predicted use pattern, where the update to the record may indicate the predicted count or count range.

Some embodiments may obtain a private key for a multi-signature wallet associated with an on-chain address that requires a plurality of private keys to access. For example, some embodiments may obtain the first private key for a first user for a multi-signature wallet. Some embodiments may then track the activity of the multi-signature wallet based on the first private key, where some embodiments may track the first private key based on geographic location where the first private key is used. For example, some embodiments may detect that a user's private key has been used at a first geographic location and is later used at a second geographic location for a first and second transaction, respectively. Some embodiments may then provide the geographic locations to a machine learning model directly. Alternatively, some embodiments may provide a geographic location as an input to an encoder neural network or other vector generating model to determine a vector based on the geographic location and then provide the vector to a machine learning model used to predict a use pattern. By accounting for a multi-signature wallet, some embodiments may accommodate specific restrictions that may not be applicable for multi-user on-chain addresses.

Some embodiments may use supervised learning methods to predict a use pattern. For example, some embodiments may use clustering techniques to predict whether an on-chain address is controlled by a single user or multiple users. As described elsewhere in this disclosure, some embodiments may generate a set of vectors in an embedding space based on transaction data such that each vector may represent multiple transactions associated with an on-chain address. Some embodiments may apply clustering operations to the vectors to determine a set of clusters, where the clustering may include density-based clustering operations, nearest neighbor clustering operations, or other clustering operations. Some embodiments may then determine whether a set of transactions indicates single-user or multi-user based on which cluster the vector(s) are part of. For example, if a first cluster is associated with single-user on-chain addresses and a second cluster is associated with multi-user on-chain addresses, some embodiments may determine whether a new on-chain address is a single-use account or a multi-use account based on which cluster the corresponding vectors of the new on-chain address is assigned. Furthermore, some embodiments may include model vectors in an embedding space to represent single-user or multiple users. Some embodiments may determine the cluster to assign to a vector based on a set of distances in an embedding space between a model vector and a sequence of vectors representing transactions of an on-chain address, where a lesser distance may indicate a greater likelihood of association with the use pattern associated with the model vector.

While some embodiments may predict a use pattern based on vectors, other embodiments may provide data to a machine learning model to predict a use pattern without using an encoder neural network or otherwise using a vector generation model. For example, some embodiments may directly provide a transaction frequency, a transaction amount, and a digital asset type transferred to the machine learning model to predict a use pattern. Furthermore, some embodiments may account for the duration that an on-chain address has been allocated with a resource amount when predicting a use pattern. For example, some embodiments may determine a duration that an on-chain address has been allocated with a required minimum resource amount (e.g., 100 Bitcoin) and include the duration as an input to the machine learning model used to predict a use pattern.

Some embodiments may limit monitoring to a specific time period. For example, some embodiments may obtain a pre-determined duration associated with an account age and monitor a set of transactions so long as transactions fall within the pre-determined duration. For example, a transaction may be timestamped to have been initially sent at a particular time, and a configuration parameter may set the pre-determined duration to be three months. Some embodiments may determine whether the timestamp is within the three-month window of an account creation time for a user. Based on a determination that the timestamp is within the three-month window, some embodiments may perform operations to predict a use pattern. By restricting node-monitoring to a specific timespan for each account, some embodiments may reduce the computational load required to maintain monitoring for multiple users.

Some embodiments may determine whether the predicted use pattern satisfies a set of alert criteria, as indicated by block 320. The set of alert criteria may include a criterion requiring that a predicted use pattern not match with a user-provided use pattern. For example, some embodiments may determine that the set of alert criteria is not satisfied if both a predicted use pattern and a user-provided use pattern indicates that an on-chain address is controlled by only one user. Some embodiments may determine that the set of alert criteria is satisfied if a predicted use pattern indicates that an on-chain address is controlled by multiple users but a use pattern provided by a first user for the on-chain address indicates that the on-chain address is controlled by the first user. As described elsewhere in this disclosure, a mismatch between a predicted use pattern indicating multiple users and a provided use pattern indicating a single user may represent an intentional mismatch, fraudulent activity, or otherwise anomalous activity.

Some embodiments may consider transfers to known on-chain addresses as additional inputs to a machine learning model when determining a use pattern. For example, some embodiments may flag a transaction from a first on-chain address to a second on-chain address based on an indicator associated with the second on-chain address. The second on-chain address may have been previously flagged with one or more labels, such as "financial institution," "non-profit," "financial entity," or "individual wallet." Some embodiments may provide a count of the set of matches between a set of on-chain addresses of a transaction and the set of flagged on-chain addresses as inputs to the machine learning model to predict a use pattern.

Some embodiments may determine that a transfer to the second on-chain address was made as a part of an on-chain application and obtain the program code of the on-chain application. Some embodiments may then use a code analysis operation to determine whether the program code of the on-chain application includes one or more flagged patterns. For example, some embodiments may scan code data from the Ethereum network, obtaining the program code of an on-chain application in the form of bytecode, and then scan the bytecode to determine if a portion of the bytecode matches with a flagged pattern for code. In response to a determination that the bytecode includes the flagged pattern, some embodiments may update an off-chain record associated with the first on-chain address (e.g., a user's financial transaction account record) to create an alert for the user or to enforce one or more restrictions on later transactions.

In response to a determination that the predicted use pattern satisfies a set of alert criteria, operations of the process 300 may proceed to operations described by block 324. Otherwise, operations of the process 300 may return to operations described for block 304.

Some embodiments may update an off-chain record associated with the on-chain address, as indicated by block 324. As described elsewhere, some embodiments may update of an on-chain address in an off-chain database to indicate anomalous activity in response to a determination that a predicted use pattern does not match with a provided use pattern. Updating the off-chain record may include accessing a first database storing the off-chain record by sending a query indicating an on-chain address to the first database. Some embodiments may then update the off-chain record to indicate that a misclassification has been detected.

Some embodiments may perform additional operations as a result of updating the off-chain record. For example, some embodiments may send a warning message to a message destination indicating that a record as been flagged as being misclassified. In some embodiments, the warning message may require a user identified by the record to provide additional information. Alternatively, or additionally, some embodiments may prevent off-chain transactions with the record that are caused by the user. For example, some embodiments may select to a record based on an on-chain address and update the record to prevent a user identified by the record from accessing another account, such as a financial services account.

Some embodiments may update the state of an on-chain application, as indicated by block 332. As described elsewhere, some embodiments may use one or more on-chain applications to enforce rules that restrict how digital assets may be transferred from an on-chain address. For example, a user may have control of their own on-chain address and transfer some amount of a digital asset to a second on-chain address of an on-chain application. Some embodiments may provide a user with access to control the state of the on-chain application and permit the user to transfer digital assets from the second on-chain address of the on-chain application. In response to a determination that a predicted use pattern does not match a provided use pattern, some embodiments may update a state of the on-chain application, where the updated state may prevent the user from updating the state of the on-chain application further or may prevent the user from further transactions or other operations causing a transfer of digital assets from the on-chain address.

Figure 4:
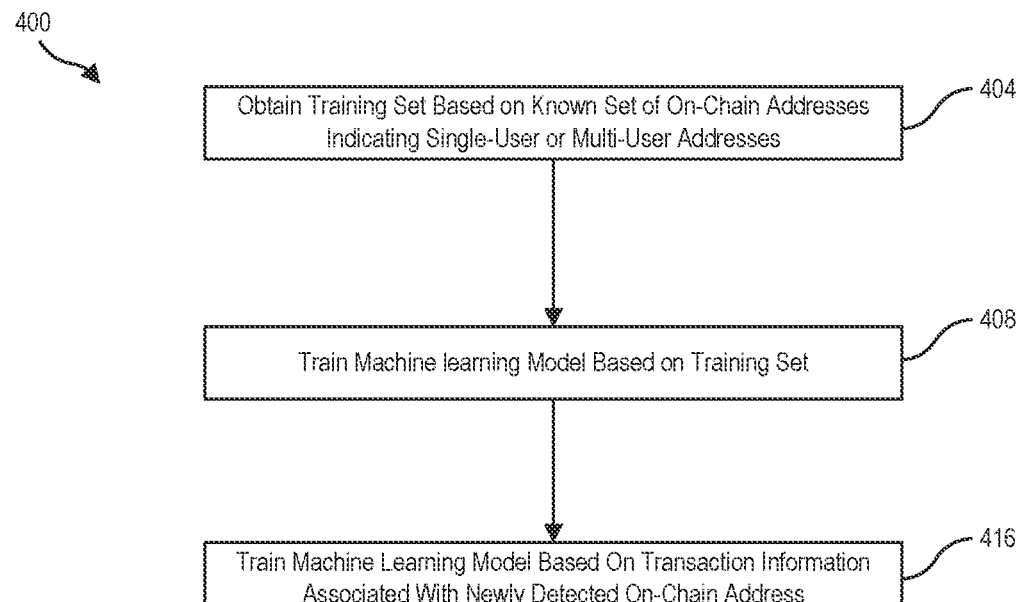
FIG. 4 shows a flowchart of a process for training a machine learning model to detect an anomalous account, in accordance with one or more embodiments.

FIG. 4 shows a flowchart of a process for training a machine learning model to detect an anomalous account, in accordance with one or more embodiments. Some embodiments may obtain a training set based on a known set of on-chain addresses indicating single or multi-user addresses, as indicated by block 404. Some embodiments may obtain the training set from an off-chain database or construct the training set from a combination of values from an off-chain database and on-chain data. For example, some embodiments may obtain a training set by obtaining on-chain data, filtering the on-chain data based on known on-chain addresses stored in an off-chain database, where the off-chain database may map the known on-chain addresses with identification of whether they are single-user or multi-user addresses. Furthermore, some embodiments may first convert transaction data into a set of vectors and then incorporate the vectors into the training set.

Some embodiments may train a machine learning model based on the training set, as indicated by block 408. The machine learning model may be used to predict a use pattern and may include various types of models. For example, the machine learning model may include a transformer neural network model, a recurrent neural network model, a random forest, a naïve Bayes model, etc. As described elsewhere in this disclosure, the training set may include a first set of training vectors mapped to a corresponding set of known multi-user on-chain addresses or may include a second set of training vectors mapped to corresponding set of known single-user on-chain addresses. During training, some embodiments may provide the training set to the machine learning model and modify learning model parameters (e.g., weights, activation function parameters, cell memory parameters, etc.) based on differences between machine learning model outputs and their known training categories. After training, the machine learning model may provide a value indicating whether a transaction or group of transactions indicates that an on-chain address is a single-user address or a multi-user address.

Some embodiments may train the machine learning model based on a newly detected on-chain address, as indicated by block 416. As described elsewhere in this disclosure, some embodiments may predict use patterns for a newly detected on-chain address that does not match the use pattern provided by a user for the on-chain address. Some embodiments may receive confirmation from a second user indicating that the predicted use pattern is correct and, in response, may add the on-chain address, the predicted use pattern, and the transaction data to a training dataset. Some embodiments may then update a machine learning model based on the updated training set.

Figure 5:
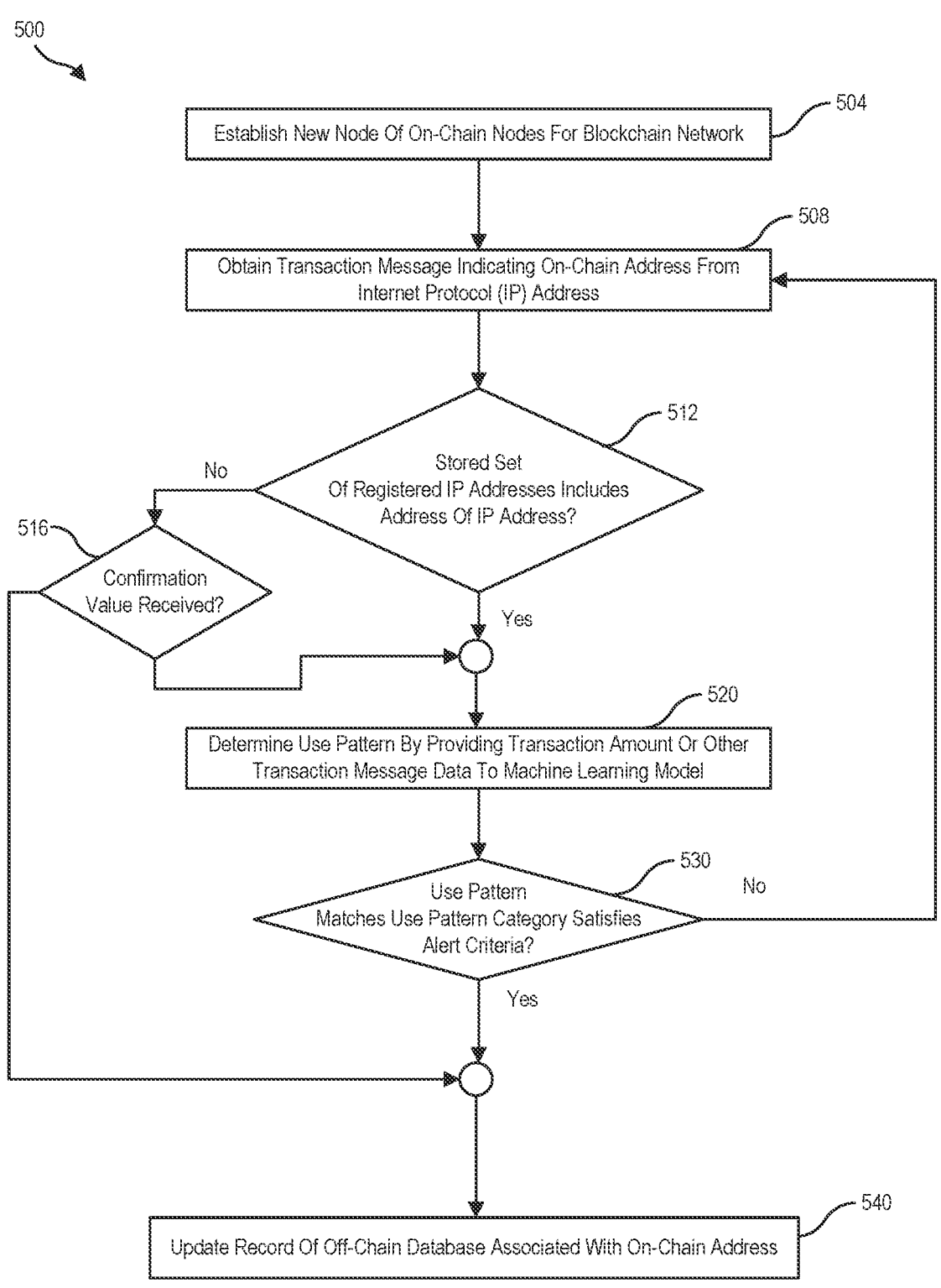
FIG. 5 shows a flowchart of a process for operating a monitored node to track IP addresses and other connection information for detecting an anomalous account, in accordance with one or more embodiments.

FIG. 5 shows a flowchart of a process for operating a monitored node to track IP addresses and other connection information for detecting an anomalous account, in accordance with one or more embodiments. Some embodiments may establish a new node of a plurality of on-chain nodes of a blockchain network, as indicated by block 504. Some embodiments may establish a new node that is joined into a plurality of on-chain nodes used to support an on-chain dataset, where the on-chain dataset may include blockchain data. The new node may act as one of various different types of nodes of a blockchain network and may vary based on the requirements and permissions of the blockchain network. For example, some embodiments may establish a full node of the Bitcoin network or the Ethereum network. Some embodiments may monitor Internet traffic activity of the new node or monitor other activity of the new node to obtain useful information associated with transaction requests that would not be stored directly on a blockchain network. In some embodiments, a user may configure their wallet to route all outflow transactions or related transaction messages from the wallet's on-chain address through the monitored node. In such a configuration, some embodiments may use the monitored node to reject transaction requests that violate one or more prohibited rules associated with an on-chain address.

Some embodiments may obtain a transaction message indicating an on-chain address from an IP address, as indicated by block 508. As used in this disclosure, a transaction message may include any type of message that causes a transaction to occur between a first on-chain address and a second on-chain address. The transaction message may be sent as a request from an IP address. As described elsewhere in this disclosure, some embodiments may obtain a transaction message at a monitored node, such as a new node established using operations described for block 504. For each received transaction message at a monitored node, some embodiments may determine whether the transaction message indicates a transfer from a registered on-chain address. For example, if a user provides a use pattern for an on-chain address, some embodiments may register the on-chain address in a database of registered on-chain addresses. Some embodiments may then determine whether a received transaction message identifies the registered on-chain address as the source address of a transfer. In response to a determination that the received transaction message does identify the registered on-chain address as a source address of a transfer, some embodiments may then retrieve the IP address of the transaction message. Furthermore, other embodiments may be broader and retrieve data for the on-chain address based on a determination that the transaction message indicates the on-chain address in some capacity instead of requiring that the on-chain address be a source on-chain address.

Some embodiments may receive, from a first user, a registration request for an on-chain address that has already been registered with another user. For example, a first user may register resources allocated to a first on-chain address as a collateral. A second user may later register the resources of the first on-chain address as collateral when registering another account. In response to determining that the first on-chain address has been registered by the second user, some embodiments may flag the second user's account to indicate the second user as being an anomalous user. Furthermore, some embodiments may flag a set of records associated with the first on-chain address as anomalous to determine whether the first user has misclassified the first on-chain address.

Some embodiments may be configured to ignore small changes in a transaction account. For example, some embodiments may determine whether a transaction message satisfies a minimum amount threshold, where the minimum amount threshold may be established beforehand or updated by a configuration parameter. Some embodiments may determine that the minimum amount threshold is satisfied if a transaction amount of a transaction message is greater than or equal to the minimum amount threshold. In response to a determination that the minimum amount threshold is satisfied, some embodiments may proceed with operations to determine whether a stored set of registered IP addresses includes the IP address of a newly received transaction message using operations described by block 512 below.

Some embodiments may determine whether a stored set of registered IP addresses includes the IP address of the transaction message, as indicated by block 512. Some embodiments may receive an initial set of IP addresses associated with a user and use this initial set of IP addresses as a stored set of registered IP addresses for an on-chain address, where the stored set of registered IP addresses may include only one IP address or may include at least two IP addresses. For example, some embodiments may receive home and office IP addresses from a user and store both IP addresses in a stored set of IP addresses in association with an on-chain address provided by the user. After first receiving a new transaction message at a monitored node, some embodiments may then compare the IP address of the newly received transaction message with this stored set of registered IP addresses.

Some embodiments may receive external instructions to update a stored set of registered IP addresses. For example, some embodiments may receive instructions to update a stored set of registered IP addresses to include a set of VPN IP addresses, where the set of VPN IP addresses may include one or more approved VPN IP addresses. By permitting a user to use an approved VPN service via the registration of an approved VPN IP address, some embodiments may provide users with greater flexibility with respect to internet access. Some embodiments may receive additional information from the VPN service itself to verify that the use pattern associated with an on-chain address is still indicative of new single use.

Some embodiments may be configured to ignore the IP addresses of transaction messages for single-case uses if the transaction is also transferring below a minimum threshold. For example, some embodiments may determine a count of messages within a pre-determined direction. Some embodiments may then determine whether the count of messages satisfies a count threshold, where the count threshold may be an integer that is greater than zero. For example, some embodiments may set the count threshold to be equal to two and may ignore a new IP address if the new IP address is a source for two different transfer outflow transaction messages. A determination that the new IP address is the source for three different transfer outflow transaction message may cause some embodiments to analyze the new IP address and compare it to a set of registered IP addresses or to perform operations to predict a use pattern, as described elsewhere in this disclosure.

Some embodiments may be configured to automatically lock a user's account based on an IP address, where locking a user's account may include preventing the user from updating one or more values of the record(s) of the account or effecting transactions based on the account. In some embodiments, a determination that a source IP address of a transaction message sent by a user matches with a known flagged IP address of a set of flagged IP addresses may cause an account record linked to the on-chain address to be locked. Once the account record is locked, a user may be prevented from effecting further changes to one or more values of the account record or effecting a transaction that would alter the one or more values.

Some embodiments may be configured to detect updates to a blockchain that indicate transfer from a registered on-chain address to another on-chain address but was not first received at a monitored node. For example, a user may initially configure their wallet to send all transaction messages through a monitored node of a blockchain network and later configure their wallet to send a transaction message to another node of the blockchain network. After this reconfiguration, the user may cause a transaction from a source on-chain address controlled by the user to another on-chain address, which may be recorded in an update to the on-chain dataset of the blockchain network. Some embodiments may then detect this recorded update to the on-chain dataset and determine whether the transaction of the recorded update can be matched to any transactions that are first sent to the monitored node. In response to a determination that no match can be found, some embodiments may indicate a pattern violation.

If the stored set of registered IP addresses includes the IP address of the newly received transaction message, some operations may permit the transaction to occur without taking further action and operations of the process 500 may return to operations described for block 508 for a later transaction message. Some embodiments may determine that the stored set of registered IP addresses does not include an IP address of a new transaction. Some embodiments may then proceed directly to operations described by block 520. Otherwise, operations of the process 500 may proceed to block 516.

Some embodiments may determine whether a confirmation value has been received, as indicated by block 516. In cases where a new IP address is encountered, some embodiments may send a confirmation message to a message destination mapped to the user, where the message destination may be an email address, a mobile device of the user, a phone number, an identifier of a messaging platform, etc. The confirmation message may include a prompt that causes a user to reply with an associated confirmation value, via the user's device. In some embodiments, the confirmation value may indicate that the user did provide a transaction message from a new IP address and that the new IP address should be added to the set of registered IP addresses. For example, some embodiments may send a confirmation message to a user with a random number and expect to receive the same random number from the user as a confirmation value. In response to receiving the confirmation value, some embodiments may then update the stored set of registered IP addresses with the newly confirmed IP address and proceed to operations described by block 520. Otherwise, operations of the process 500 may proceed to operations described by block 540, where updating a record may include flagging a record as indicating a use pattern violation.

Some embodiments may determine a use pattern by providing the transaction data and information derived by the IP address to a machine learning model, as indicated by block 520. As described elsewhere in this disclosure, some embodiments may perform one or more operations of the process 300 to convert transaction data into a vector and provide the vector in addition with other information associated with the transaction to a machine learning model to predict a use pattern. Alternatively, or additionally, some embodiments may determine a use pattern without converting transaction data into an embedding space. For example, some embodiments may provide a set of transaction amounts and a corresponding set of IP addresses to a machine model that outputs a predicted use pattern.

Alternatively, or additionally, some embodiments may determine a set of geographic locations based on a set of IP addresses and provide the set of geographic locations to the machine learning model as an input, in conjunction with other inputs of the machine learning model, to determine a use pattern. Some embodiments may permit users to access their account from multiple IP addresses but may further consider transportation time between the geographic locations corresponding with the multiple IP addresses. For example, some embodiments may receive a first transaction message at a first time from a first IP address and a second transaction message at a second time from a second IP address. Some embodiments may then determine a first geographic location based on the first IP address and a second geographic location based on the second IP address. For example, some embodiments may determine a first geographic location labeled with the city "Austin, Texas" based on the first IP address and determine a second geographic location labeled with the city "Minneapolis, Minnesota" based on the second IP address. Some embodiments may then determine a time difference between when the two transaction messages were sent and compute an effective transportation time that would be required between the two geographic locations to satisfy the time difference. In response to a determination that the effective transportation time is greater than the transport time threshold, some embodiments may then proceed to operations described by block 542 to update an off-chain database.

Some embodiments may determine whether the predicted use pattern satisfies an alert criteria, as indicated by block 530. Some embodiments may perform operations similar to those described for block 320, such as determining whether the predicted use pattern matches a provided use pattern. For example, some embodiments may determine that the predicted use pattern does not match a provided use pattern if the predicted use pattern indicates a multi-user on-chain address and the provided use pattern indicates a single-user on-chain address. In response to a determination that the predicted use pattern does not match with a provided use pattern, some embodiments may proceed to operations described by block 540. Otherwise, operations of the process 500 may return to operations described for block 508.

Some embodiments may update a record of an off-chain database associated with the on-chain address, as indicated by block 540. Some embodiments may perform operations similar to those described for block 324 when updating the record of an off-chain database. Some embodiments may choose the record of the off-chain database using a query that identifies the on-chain address and update the record to prevent a user from accessing an account or modifying a set of values of the account. For example, some embodiments may update an off-chain record indicating an on-chain address to indicate a use pattern violation, which may cause the record to become locked with respect to a user identified by the record. Furthermore, some embodiments may perform operations similar to those described for block 332 to update an on-chain application. For example, some embodiments may prevent a transfer from an on-chain address linked to the on-chain application in response to a determination that an IP address is not found in the set of registered IP addresses.

The operations of each method presented in this disclosure are intended to be illustrative and non-limiting. It is contemplated that the operations or descriptions of FIGS. 3-5 may be used with any other embodiment of this disclosure. In addition, the operations and descriptions described in relation to FIGS. 3-5 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. The processing devices may include one or more devices configured through hardware, firmware, and/or software to be specifically designed for the execution of one or more of the operations of the methods. For example, it should be noted that any of the devices or equipment discussed in relation to FIGS. 1-2 could be used to perform one or more of the operations in FIG. 3-5.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combination of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems 171-177 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems 171-177 may provide more or less functionality than is described. For example, one or more of subsystems 171-177 may be eliminated, and some or all of its functionality may be provided by other ones of subsystems 171-177. As another example, additional subsystems may be programmed to perform some or all of the functionality attributed herein to one of subsystems 171-177 described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already-generated value.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," " item 2," and "item 3," a first item of a set of items may be "item 2" unless otherwise stated.

ENUMERATED EMBODIMENTS

The present techniques will be better understood with reference to the following enumerated embodiments:

A.1. A method comprising: retrieving a set of on-chain transactions from on-chain transaction data based on an on-chain address; generating, via a machine learning model, a sequence of vectors based on the set of on-chain transactions; predicting a first use pattern of the on-chain address based on the sequence of vectors; and generating an alert related to anomalous activity based on a determination that the first use pattern does not match with a second use pattern.

A.2. A method comprising: retrieving a set of on-chain transactions of an on-chain address from a scan of on-chain transactions based on a request identifying the on-chain address; generating a sequence of embedding vectors by providing the set of on-chain transactions to an encoder neural network, wherein each respective embedding vector corresponds with a respective transaction of the set of on-chain transactions; predicting a use pattern of the on-chain address by providing the sequence of embedding vectors to a machine learning model, wherein the use pattern indicates multiple users; determining whether the predicted use pattern matches with a provided use pattern that is provided by a user, wherein the provided use pattern indicates a single user; and in response to a determination that the predicted use pattern does not match with the provided use pattern, updating a record of the on-chain address in an off-chain database to indicate anomalous activity.

A.3. A method comprising: retrieving a set of on-chain transactions of an on-chain address from a scan of on-chain transactions based on a request identifying the on-chain address; generating a sequence of embedding vectors by providing the set of on-chain transactions to a first machine learning model; predicting a first use pattern of the on-chain address by providing the sequence of embedding vectors to a second machine learning model; determining whether the first use pattern matches with a second use pattern; and in response to a determination that the first use pattern does not match with the second use pattern, updating a record of the on-chain address in an off-chain database to indicate anomalous activity.

A.4. The method of any of embodiments A.1 to A.3, wherein predicting the first use pattern comprises predicting the first use pattern based on a subset of on-chain transactions of the set of on-chain transactions, and wherein each respective transaction of the subset of on-chain transactions is indicated to have occurred within a pre-determined duration.

A.5. The method of any of embodiments A.1 to A.4, further comprising: obtaining a hierarchical deterministic key; and determining a plurality of derived keys based on the hierarchical deterministic key, wherein: a first derived key of the plurality of derived keys corresponds with the on-chain address; obtaining a plurality of on-chain addresses based on the plurality of derived keys; retrieving the set of on-chain transactions comprises retrieving a superset of on-chain transactions, wherein each respective set of on-chain transactions indicates a respective on-chain address of the plurality of on-chain addresses; generating the sequence of embedding vectors comprises generating a plurality of vector sequences based on the superset of on-chain transactions; and predicting the first use pattern comprises predicting the first use pattern based on the plurality of vector sequences.

A.6. The method of any of embodiments A.1 to A.5, wherein the on-chain address is a first on-chain address, and wherein the first on-chain address is indicated as controlled by a user, the method further comprising, in response to a determination that the first use pattern does not match with the second use pattern, updating a state of an on-chain application to prevent further transactions with a second on-chain address, wherein the second on-chain address is an address of the on-chain application accessible to the user.

A.7. The method of any of embodiments A.1 to A.6, further comprising obtaining a set of internet protocol (IP) addresses mapped to the set of on-chain transactions, wherein each respective IP address maps to a respective on-chain transaction, and wherein predicting the first use pattern further comprises predicting the first use pattern based on the set of IP addresses.

A.8. The method of embodiment A.7, wherein the on-chain address is provided by a user, further comprising: determining whether a first IP address of the set of IP addresses matches with a virtual private network (VPN) IP address; and sending a warning to a message destination mapped to the user in response to a determination that the first IP address matches with the VPN IP address.

A.9. The method of any of embodiments A.1 to A.8, wherein the on-chain address is a first on-chain address, and wherein the set of on-chain transactions includes a transaction with a second on-chain address, and wherein the second on-chain address is an address of an on-chain application, further comprising: determining whether program code of the on-chain application comprises a flagged pattern; and in response to a determination that the program code comprises the flagged pattern, updating the record of the on-chain address.

A.10. The method of any of embodiments A.1 to A.9, further comprising: obtaining a set of flagged on-chain addresses; and determining a set of matches between the set of on-chain transactions and the set of flagged on-chain addresses, wherein determining the first use pattern comprises determining the first use pattern based on the set of matches.

A.11. The method of any of embodiments A.1 to A.10, wherein updating the record of the on-chain address in the off-chain database comprises sending a warning message to a message destination associated with a user, wherein the on-chain address is provided by the user.

A.12. The method of any of embodiments A.1 to A.11, wherein the machine learning model is a first machine learning model, and wherein predicting the first use pattern comprises predicting the first use pattern using a second machine learning model, the operations further comprising: obtaining a first training set comprising a first set of training vectors mapped to a set of known single-user on-chain addresses; obtaining a second training set comprising a second set of training vectors mapped to a set of known multi-user on-chain addresses; and training the second machine learning model based on the first training set and the second training set.

A.13. The method of any of embodiments A.1 to A.12, the operations further comprising: retrieving a first key of a plurality of private keys, wherein accessing the on-chain address requires the plurality of private keys; and determining a set of geographic locations associated with the set of on-chain transactions based on transactions associated with the first key, wherein predicting the first use pattern comprises predicting the first use pattern based on the set of geographic locations.

A.14. The method of any of embodiments A.1 to A.13, wherein generating the sequence of vectors comprises generating the sequence of vectors based on transaction amounts of the set of on-chain transactions.

A.15. The method of any of embodiments A.1 to A.14, wherein the on-chain address is a first on-chain address, further comprising determining an address type category based on a second on-chain address of at least one transaction of the set of on-chain transactions, wherein generating the sequence of vectors comprises generating at least one vector based on the address type category.

A.16. The method of any of embodiments A.1 to A.15, wherein the first use pattern indicates a first predicted count of users, the operations further comprising updating a record of the on-chain address based on the first predicted count of users.

A.17. The method of any of embodiments A.1 to A.16, further comprising determining a set of differences indicating differences between transaction amounts of the set of on-chain transactions, wherein generating the sequence of vectors comprises generating the sequence of vectors based on the set of differences.

A.18. The method of any of embodiments A.1 to A.17, further comprising determining a set of time differences indicating time differences between transaction events of the set of on-chain transactions, wherein generating the sequence of vectors comprises generating the sequence of vectors based on the set of time differences.

A.19. The method of any of embodiments A.1 to A.18, wherein: the sequence of vectors is in an embedding space; predicting the first use pattern of the on-chain address comprises: determining a set of distances in the embedding space between a model vector and the sequence of vectors; and selecting the first use pattern based on the set of distances.

A.20. The method of any of embodiments A.1 to A.19, further comprising determining duration that the on-chain address has been allocated with a resource amount that is greater than a minimum resource amount, wherein predicting the first use pattern comprises predicting the first use pattern based on the duration.

A.21. One or more tangible, non-transitory, machine-readable media storing instructions that, when executed by a set of processors, cause the set of processors to effectuate operations comprising those of any of embodiments A.1 to A.20.

A.22. A system comprising: a set of processors and memory storing computer program instructions that, when executed by the set of processors, cause the set of processors to effectuate operations comprising those of any of embodiments A.1 to A.20.

B.1. A method comprising: obtaining, from a set of internet protocol (IP) addresses, a set of transaction messages indicating an on-chain address; determining whether a stored set of registered IP addresses comprises each respective address of the set of IP addresses; determining whether a predicted use pattern related to the set of transaction messages matches a use pattern category, the predicted use pattern being determined using a machine learning model; and updating a record of an off-chain database associated with the on-chain address based on a determination that the stored set of registered IP addresses does not comprise each respective address of the set of IP addresses and a determination that the predicted use pattern matches the use pattern category.

B.2. A method comprising: obtaining, from a source IP address, a transaction message indicating a source on-chain address and a destination on-chain address, wherein the transaction message causes an update to a state of an on-chain dataset; determining whether a stored set of registered IP addresses comprises the source IP address; in response to a determination that the stored set of registered IP addresses does not comprise the source IP address, determining a predicted use pattern by providing an amount indicated by the transaction message to a machine learning model; determining whether the predicted use pattern matches a use pattern category indicating that multiple users control the source on-chain address; and in response to a determination that the predicted use pattern matches the use pattern category, updating a record of an off-chain database to indicate a use pattern violation for the source on-chain address.

B.3. A method comprising: obtaining, from an internet protocol (IP) address, a transaction message indicating an on-chain address; determining whether a stored set of registered IP addresses comprises the IP address; in response to a determination that the stored set of registered IP addresses does not comprise the IP address, determining a use pattern using a machine learning model based on the transaction message; determining whether the use pattern matches a use pattern category; and in response to a determination that the use pattern matches the use pattern category, updating a record of an off-chain database to indicate a use pattern violation for the on-chain address.

B.4. The method of any of embodiments B.1 to B.3, wherein the on-chain address is a first on-chain address, and wherein the use pattern is a first use pattern, and wherein the IP address is a first IP address, and wherein the record is a first record, further comprising: obtaining a set of transaction messages from a second IP address indicating transactions with a second on-chain address, obtaining an on-chain dataset comprising updates associated with the second on-chain address; determining whether a recorded update of the on-chain dataset indicating the second on-chain address matches any transaction message of the set of transaction messages obtained from the second IP address; in response to a determination that the recorded update indicating the second on-chain address does not match any transaction message of the set of transaction messages obtained from the second IP address, updating a second record of the off-chain database to indicate a use pattern violation for the second on-chain address.

B.5. The method of any of embodiments B.1 to B.4, further comprising establishing a new node of a plurality of on-chain nodes, wherein an on-chain dataset is distributed across the plurality of on-chain nodes, and wherein obtaining the transaction message comprises obtaining the transaction message at the new node from the IP address.

B.6. The method of any of embodiments B.1 to B.5, further comprising obtaining a pre-determined duration, wherein predicting the use pattern comprises predicting the use pattern based on a determination that the transaction message is timestamped with a time that is within the pre-determined duration.

B.7. The method of any of embodiments B.1 to B.6, wherein providing the machine learning model comprises determining a predicted use pattern by: determining a vector using an encoder neural network based on the IP address and an amount of the transaction message; and providing the vector to the machine learning model.

B.8. The method of any of embodiments B.1 to B.7, wherein the record associates the on-chain address with a first user, further comprising: receiving a request indicating the on-chain address from a second user; and in response to a determination that the on-chain address is already associated with the first user, updating the record of the second user to indicate the second user as anomalous.

B.9. The method of any of embodiments B.1 to B.8, wherein the stored set of registered IP addresses comprises at least two IP addresses.

B.10. The method of any of embodiments B.1 to B.9, wherein the IP address is a first IP address of a user, further comprising: obtaining, from a second IP address, a second set of transaction messages indicating the on-chain address; determining whether a set of flagged IP addresses comprises the second IP address; and in response to a determination that the set of flagged IP addresses comprises the IP address, locking an account of the user.

B.11. The method of embodiment B.10, further comprising: retrieving a set of virtual private network (VPN) IP addresses; and updating the set of flagged IP addresses based on the set of VPN IP addresses.

B.12. The method of any of embodiments B.1 to B.11, further comprising: determining a count of messages of the set of transaction messages, wherein determining whether the predicted use pattern matches the use pattern category comprises determining whether the predicted use pattern matches the use pattern category in response to a determination that the count is less than or equal to a count threshold.

B.13. The method of any of embodiments B.1 to B.12, wherein the stored set of registered IP addresses is associated with a user, the operations further comprising: determining that the stored set of registered IP addresses does not comprise a first IP address of the set of IP addresses; sending, to a message destination mapped to the user, a confirmation message indicating the first IP address of the set of IP addresses; and in response to receiving a confirmation value from the user, updating the stored set of registered IP addresses with the first IP address.

B.14. The method of any of embodiments B.1 to B.13, wherein the record associates the on-chain address with a user, and wherein updating the record comprises preventing the user identified by the record from accessing an account associated with the on-chain address.

B.15. The method of any of embodiments B.1 to B.14, wherein determining whether the stored set of registered IP addresses comprises the set of IP addresses comprises: determining whether a first transaction message of the set of transaction messages satisfies a minimum amount threshold, wherein the first transaction message is sent via a first IP address of the set of IP addresses; and in response to a determination that the set of transaction messages satisfies the minimum amount threshold, determining whether the stored set of registered IP addresses comprises the first IP address.

B.16. The method of any of embodiments B.1 to B.15, further comprising: obtaining an update indicating an approved virtual private network (VPN) IP address; and updating the stored set of registered IP addresses to comprise the approved VPN IP address.

B.17. The method of any of embodiments B.1 to B.16, further comprising determining a geographic location based on a first IP address of the set of IP addresses, wherein determining the predicted use pattern comprises providing the geographic location to the machine learning model.

B.18. The method of any of embodiments B.1 to B.17, further comprising: determining a first geographic location based on a first IP address of the set of IP addresses, wherein a first transaction message is sent from the first IP address; determining a second geographic location based on a second IP address of the set of IP addresses, wherein a second transaction message is sent from the second IP address; and determining a time difference between when the first transaction message and the second transaction message are sent; determining a transport time threshold based on a distance between the first geographic location and the second geographic location; and in response to a determination that the time difference is greater than the transport time threshold, updating the record of the off-chain database to indicate anomalous activity.

B.19. The method of any of embodiments B.1 to B.18, wherein the on-chain address is an address of an on-chain application, the operations further comprising: in response to the determination that the stored set of registered IP addresses does not comprise the set of IP addresses, updating a state of the on-chain application; based on the update to the state of the on-chain application, preventing transfers from the on-chain address.

B.20. The method of embodiment B.19, further comprising: receiving a request to transfer an amount of a digital asset from the on-chain address; determining whether a minimum threshold is satisfied based on the request and a preexisting amount associated with the on-chain address; and transferring the amount based on a determination that the minimum threshold is satisfied.

B.21. One or more tangible, non-transitory, machine-readable media storing instructions that, when executed by a set of processors, cause the set of processors to effectuate operations comprising those of any of embodiments B.1 to B.20.

B.22. A system comprising: a set of processors and memory storing computer program instructions that, when executed by the set of processors, cause the set of processors to effectuate operations comprising those of any of embodiments B.1 to B.20.

What is claimed is:

1. A system for detecting anomalous activities based on internet protocol (IP) addresses related to on-chain messages, the system comprising a computer system that comprises one or more processors programmed with computer program instructions that, when executed, cause the computer system to perform operations comprising:

obtaining, via the Internet, from a set of internet protocol (IP) addresses, a set of messages indicating an on-chain address;

inputting the set of IP addresses and a message count of the set of messages to an encoder neural network to obtain an embedding vector;

providing the embedding vector to a machine learning model to obtain a predicted use pattern related to the on-chain address;

obtaining, via a network database, a stored set of registered IP addresses; and based on the predicted use pattern and the stored set of registered IP addresses not comprising each respective address of the set of IP addresses, stopping a blockchain operation associated with the on-chain address.

2. The system of claim 1, wherein the on-chain address is a first on-chain address, and wherein the set of IP addresses comprises a first IP address, the operations further comprising:

updating a first record of an off-chain database associated with the on-chain address;

obtaining a second set of messages from a second IP address indicating blockchain operations associated with a second on-chain address;

obtaining an on-chain dataset comprising updates associated with the second on-chain address;

determining whether a recorded update of the on-chain dataset indicating the second on-chain address matches any message of the second set of messages obtained from the second IP address;

in response to a determination that the recorded update indicating the second on-chain address does not match any message of the second set of messages obtained from the second IP address, updating a second record of the off-chain database to indicate a use pattern violation for the second on-chain address.

3. The system of claim 1, wherein the stored set of registered IP addresses is associated with a user, the operations further comprising:

determining that the stored set of registered IP addresses does not comprise a first IP address of the set of IP addresses;

sending, to a message destination mapped to the user, a confirmation message indicating the first IP address of the set of IP addresses; and in response to receiving a confirmation value from the user, updating the stored set of registered IP addresses with the first IP address.

4. The system of claim 1, the operations further comprising updating a record of an off-chain database associated with the on-chain address, wherein the record associates the on-chain address with a user, and wherein updating the record comprises preventing the user identified by the record from accessing an account associated with the on-chain address.

5. A method comprising:

obtaining, from a set of internet protocol (IP) addresses, a set of messages indicating an on-chain address;

inputting the set of IP addresses and a message count of the set of messages to an encoder neural network to obtain an embedding vector;

providing the embedding vector to a machine learning model to obtain a predicted use pattern related to the on-chain address;

determining that a stored set of registered IP addresses does not comprise each respective address of the set of IP addresses; and based on the predicted use pattern and the determining that the stored set of registered IP addresses does not comprise each respective address of the set of IP addresses, stopping a blockchain operation associated with the on-chain address.

6. The method of claim 5, further comprising establishing a new node of a plurality of on-chain nodes, wherein an on-chain dataset is distributed across the plurality of on-chain nodes, and wherein obtaining the set of messages comprises obtaining the set of messages at the new node from the set of IP addresses.

7. The method of claim 5, further comprising:

obtaining a pre-determined duration, wherein providing the embedding vector to the machine learning model comprises providing the embedding vector to the machine learning model based on a determination that a message of the set of messages is timestamped with a time that is within the pre-determined duration.

8. The method of claim 5, further comprising:

updating a record of an off-chain database associated with the on-chain address, wherein the record associates the on-chain address with a first user;

receiving a request indicating the on-chain address from a second user; and in response to a determination that the on-chain address is already associated with the first user, updating the record of the second user to indicate the second user as anomalous.

9. The method of claim 5, wherein the stored set of registered IP addresses comprises at least two IP addresses.

10. The method of claim 5, wherein the set of IP addresses comprises a first IP address of a user, further comprising:

obtaining, from a second IP address, a second set of messages indicating the on-chain address;

determining a result indicating that a set of flagged IP addresses comprises the second IP address; and in response to determining the result, locking an account of the user.

11. The method of claim 10, further comprising:

retrieving a set of virtual private network (VPN) IP addresses; and updating the set of flagged IP addresses based on the set of VPN IP addresses.

12. A set of non-transitory, machine-readable media storing instructions that, when executed by a set of processors, perform operations comprising:

obtaining, from a set of internet protocol (IP) addresses, a set of messages indicating an on-chain address;

inputting the set of IP addresses and a message count of the set of messages to an encoder neural network to obtain an embedding vector;

providing the embedding vector to a machine learning model to obtain a predicted use pattern related to the on-chain address; and based on the predicted use pattern and a stored set of registered IP addresses not comprising each respective address of the set of IP addresses, stopping a blockchain operation associated with the on-chain address.

13. The set of non-transitory, machine-readable media of claim 12, further comprising determining a count of messages of the set of messages, wherein stopping the blockchain operation comprises determining whether the predicted use pattern matches a use pattern category in response to a determination that the count is less than or equal to a count threshold.

14. The set of non-transitory, machine-readable media of claim 12, wherein determining whether the stored set of registered IP addresses comprises the set of IP addresses comprises:

determining whether a first message of the set of messages satisfies a minimum amount threshold, wherein the first message is sent via a first IP address of the set of IP addresses; and in response to a determination that the set of messages satisfies the minimum amount threshold, determining whether the stored set of registered IP addresses comprises the first IP address.

15. The set of non-transitory, machine-readable media of claim 12, further comprising:

obtaining an update indicating an approved virtual private network (VPN) IP address; and updating the stored set of registered IP addresses to comprise the approved VPN IP address.

16. The set of non-transitory, machine-readable media of claim 12, further comprising determining a geographic location based on a first IP address of the set of IP addresses, wherein determining the predicted use pattern comprises providing the geographic location to the machine learning model.

17. The set of non-transitory, machine-readable media of claim 12, the operations further comprising:

determining a first geographic location based on a first IP address of the set of IP addresses, wherein a first message is sent from the first IP address;

determining a second geographic location based on a second IP address of the set of IP addresses, wherein a second message is sent from the second IP address; and determining a time difference between when the first message and the second message are sent;

determining a transport time threshold based on a distance between the first geographic location and the second geographic location; and in response to a determination that the time difference is greater than the transport time threshold, updating a record of an off-chain database to indicate anomalous activity.

18. The set of non-transitory, machine-readable media of claim 12, wherein the on-chain address is an address of an on-chain application, the operations further comprising:

in response to a determination that the stored set of registered IP addresses does not comprise the set of IP addresses, updating a state of the on-chain application;

based on the updating of the state of the on-chain application, preventing transfers from the on-chain address.

19. The set of non-transitory, machine-readable media of claim 18, the operations further comprising:

receiving a request to transfer an amount of a digital asset from the on-chain address;

determining whether a minimum threshold is satisfied based on the request and a preexisting amount associated with the on-chain address; and transferring the amount based on a determination that the minimum threshold is satisfied.

\* \* \* \* \*